(12) United States Patent
Okada et al.

(10) Patent No.: US 11,190,625 B2
(45) Date of Patent: Nov. 30, 2021

(54) RECEPTION DEVICE, DATA PROCESSING METHOD, AND TRANSMISSION/RECEPTION SYSTEM

(71) Applicant: SONY CORPORATION, Tokyo (JP)

(72) Inventors: Satoshi Okada, Tokyo (JP); Yuichi Hirayama, Chiba (JP); Hirofumi Maruyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 562 days.

(21) Appl. No.: 16/077,706

(22) PCT Filed: Mar. 9, 2017

(86) PCT No.: PCT/JP2017/009364
§ 371 (c)(1),
(2) Date: Aug. 13, 2018

(87) PCT Pub. No.: WO2017/163888
PCT Pub. Date: Sep. 28, 2017

(65) Prior Publication Data
US 2021/0195001 A1 Jun. 24, 2021

(30) Foreign Application Priority Data
Mar. 22, 2016 (JP) .............................. JP2016-056837

(51) Int. Cl.
*H04L 29/06* (2006.01)
*H04J 3/00* (2006.01)
*H04N 21/438* (2011.01)

(52) U.S. Cl.
CPC ................ *H04L 69/22* (2013.01); *H04J 3/00* (2013.01); *H04N 21/438* (2013.01)

(58) Field of Classification Search
None
See application file for complete search history.

(56) References Cited

U.S. PATENT DOCUMENTS

2001/0055271 A1* 12/2001 Okada ................. H04L 27/2662
370/206
2018/0019903 A1* 1/2018 Hwang ............... H04L 65/4076
(Continued)

FOREIGN PATENT DOCUMENTS

CN 1317889 A 10/2001
DE 60143236 11/2010
(Continued)

OTHER PUBLICATIONS

English Translation for JP2009201117, Sep. 3, 2009.*
(Continued)

*Primary Examiner* — Kenny S Lin
(74) *Attorney, Agent, or Firm* — Chip Law Group

(57) ABSTRACT

The present technology relates to a reception device, a data processing method, and a transmission/reception system capable of shortening time to output a packet. The reception device receives a transmission signal obtained by processing a multiplexed stream including a plurality of packets, analyzes transmission control information for controlling transmission of the transmission signal, decodes the transmission signal on the basis of an analysis result of the transmission control information, analyzes the multiplexed stream obtained by decoding the transmission signal and sets packet division information for dividing the packets from the multiplexed stream, the packet division information according to at least one of the analysis result of the transmission control information or an analysis result of the multiplexed stream, and divides the multiplexed stream into the packets on the basis of the set packet division information. The present technology is applicable to a receiver of digital broadcasting, for example.

9 Claims, 14 Drawing Sheets

(56) References Cited

U.S. PATENT DOCUMENTS

2018/0213070 A1\* 7/2018 Ooishi ................ H04N 21/615
2018/0352290 A1\* 12/2018 Maruyama ............ H04J 3/1605

FOREIGN PATENT DOCUMENTS

| EP | 1143678 A2 | 10/2001 |
| --- | --- | --- |
| JP | 2001-292121 A | 10/2001 |
| JP | 2003-037573 A | 2/2003 |
| JP | 2004-247881 A | 9/2004 |
| JP | 2008-136052 A | 6/2008 |
| JP | 2009-201117 A | 9/2009 |
| JP | 2014-204385 A | 10/2014 |
| JP | 2015-156636 A | 8/2015 |
| WO | 2016/031173 A1 | 3/2016 |

OTHER PUBLICATIONS

International Search Report and Written Opinion of PCT Application No. PCT/JP2017/009364, dated Apr. 18, 2017, 10 pages of ISRWO.

\* cited by examiner

RECEPTION DEVICE, DATA PROCESSING METHOD, AND TRANSMISSION/RECEPTION SYSTEM

CROSS REFERENCE TO RELATED APPLICATIONS

This application is a U.S. National Phase of International Patent Application No. PCT/JP2017/009364 filed on Mar. 9, 2017, which claims priority benefit of Japanese Patent Application No. JP 2016-056837 filed in the Japan Patent Office on Mar. 22, 2016. Each of the above-referenced applications is hereby incorporated herein by reference in its entirety.

TECHNICAL FIELD

The present technology relates to a reception device, a data processing method, and a transmission/reception system, and especially relates to a reception device, a data processing method, and a transmission/reception system capable of shortening time to output a packet.

BACKGROUND ART

In digital broadcasting, video and audio data are divided into packet units and multiplexed to be transmitted. As a classification of such a packet, there is a fixed length packet and a variable length packet. In multiplexed transmission using the variable length packet, the multiplexed stream is divided into the variable length packets on a reception side using packet division information in general.

Furthermore, the applicant already proposes a method of shortening initial rising time from when reception starts until video and audio are output by holding transmission control information in advance and using the transmission control information held in advance as preset information when switching a reception channel (for example, refer to Patent Document 1).

CITATION LIST

Patent Document

Patent Document 1: Japanese Patent Application Laid-Open No. 2001-292121

SUMMARY OF THE INVENTION

Problems to be Solved by the Invention

The method disclosed in Patent Document 1 described above is effective for information considered to be less likely to change in one reception channel such as information necessary for decoding the transmission signal (for example, modulation scheme and error correction encoding rate) out of the transmission control information; however, it is difficult to hold information difficult to be predicted in advance (information changing for each frame) such as the packet division information as the preset information.

Therefore, a proposal to shorten the time to output the packet even in a case where the packet division information is included as the transmission control information is requested.

The present technology is achieved in view of such a situation, and an object thereof is to make it possible to shorten the time to packet output.

Solutions to Problems

A reception device according to a first aspect of the present technology is a reception device provided with a reception unit which receives a transmission signal obtained by processing a multiplexed stream including a plurality of packets, a transmission control information analysis unit which analyzes transmission control information for controlling transmission of the transmission signal, a decoding unit which decodes the transmission signal on the basis of an analysis result of the transmission control information, a packet information analysis unit which analyzes the multiplexed stream obtained by decoding the transmission signal and sets packet division information for dividing the packets from the multiplexed stream, the packet division information according to at least one of the analysis result of the transmission control information or an analysis result of the multiplexed stream, and a packet processing unit which divides the multiplexed stream into the packets on the basis of the set packet division information.

The reception device according to the first aspect of the present technology may be an independent device or may be an internal block which forms one device. Furthermore, a data processing method according to the first aspect of the present technology is the data processing method corresponding to the reception device according to the first aspect of the present technology described above.

In the reception device and the data processing method according to the first aspect of the present technology, a transmission signal obtained by processing a multiplexed stream including a plurality of packets is received, transmission control information for controlling transmission of the transmission signal is analyzed, the transmission signal is decoded on the basis of an analysis result of the transmission control information, the multiplexed stream obtained by decoding the transmission signal is analyzed and packet division information for dividing the packets from the multiplexed stream, the packet division information according to at least one of the analysis result of the transmission control information or an analysis result of the multiplexed stream is set, and the multiplexed stream is divided into the packets on the basis of the set packet division information.

A transmission/reception system according to a second aspect of the present technology is a transmission/reception system provided with a transmission device and a reception device, in which the transmission device includes a transmission unit which transmits a transmission signal obtained by processing a multiplexed stream including a plurality of packets, and the reception device includes a reception unit which receives the transmission signal transmitted from the transmission device, a transmission control information analysis unit which analyzes transmission control information for controlling transmission of the transmission signal, a decoding unit which decodes the transmission signal on the basis of an analysis result of the transmission control information, a packet information analysis unit which analyzes the multiplexed stream obtained by decoding the transmission signal and sets packet division information for dividing the packets from the multiplexed stream, the packet division information according to at least one of the analysis result of the transmission control information or an analysis result of the multiplexed steam, and a packet processing unit which divides the multiplexed stream into the packets on the basis of the set packet division information.

In the transmission/reception system according to the second aspect of the present technology, the transmission device transmits a transmission signal obtained by processing a multiplexed stream including a plurality of packets, and the reception device receives the transmission signal transmitted from the transmission device, analyzes transmission control information for controlling transmission of the transmission signal, decodes the transmission signal on the basis of an analysis result of the transmission control information, analyzes the multiplexed stream obtained by decoding the transmission signal and sets packet division information for dividing the packets from the multiplexed stream, the packet division information according to at least one of the analysis result of the transmission control information or an analysis result of the multiplexed stream, and divides the multiplexed stream into the packets on the basis of the set packet division information.

Effects of the Invention

According to the first aspect and the second aspect of present technology, the time until the packet output may be shortened.

Note that, the effects herein described are not necessarily limited and may be any of the effects described in the present disclosure.

MODE FOR CARRYING OUT THE INVENTION

Embodiments of the present technology are hereinafter described with reference to the drawings. Note that the description is given in the following order.

1. Outline of Current Standard
2. Configuration of Present Technology
(1) System Configuration
(2) Flow of Processing on Reception Side
3. Variation
4. Configuration of Computer <1. Outline of Current Standard>

(Correlation Diagram of Packet)

Figure 1:
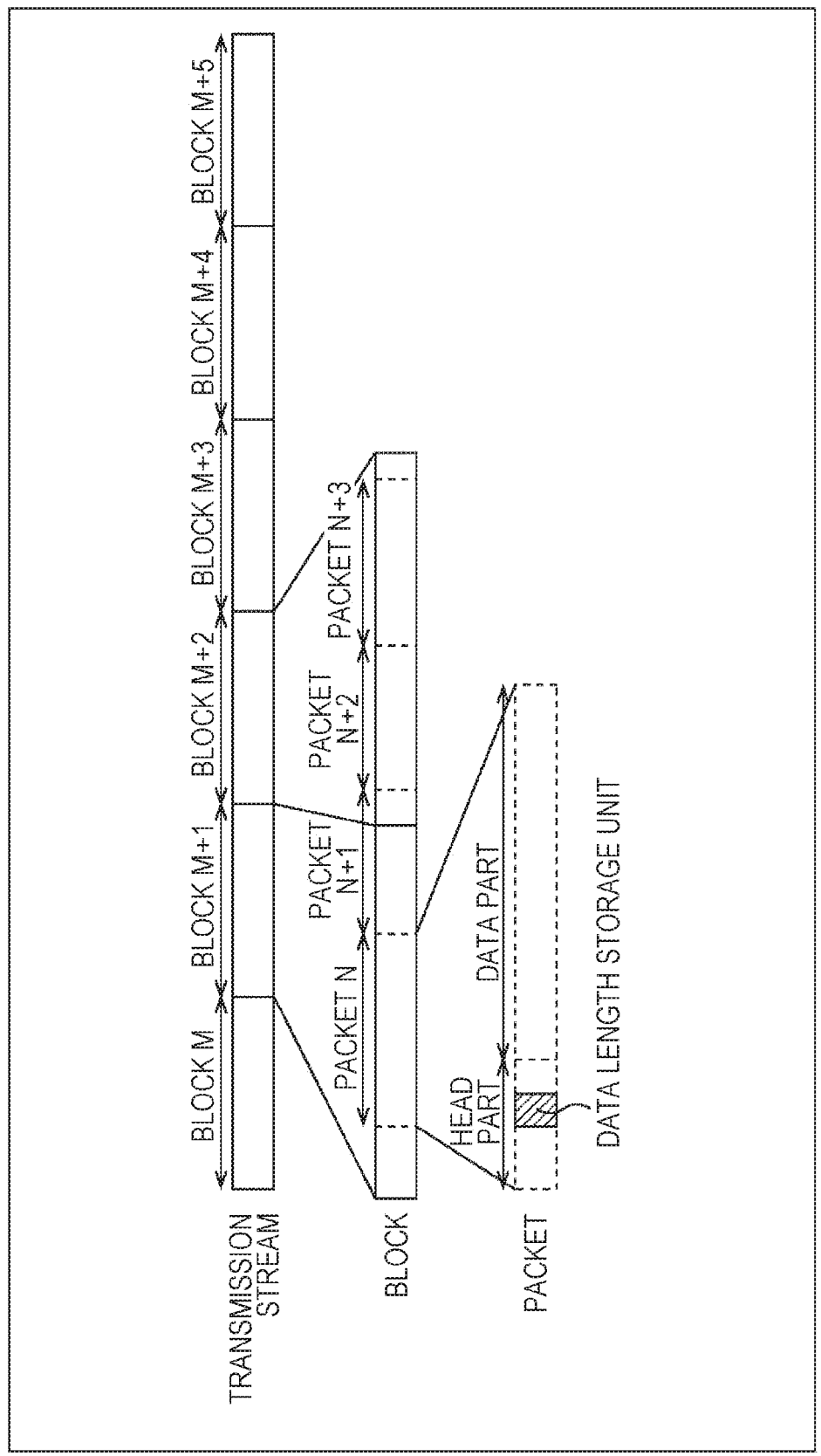
FIG. 1 is a view illustrating a correlation among a transmission stream, a block, and a packet.

FIG. 1 is a view illustrating a correlation among a transmission stream, a block, and a packet.

In digital broadcasting, video and audio data are divided into packet units and multiplexed to be transmitted. In such multiplexed transmission, error correction encoding processing is performed on a signal delivered as a transmission stream in a transmission device on a transmission side, so that a reception device on a reception side performs error correction decoding processing on the signal delivered as the transmission stream.

In general, a unit of error correction encoding and error correction decoding (hereinafter referred to as a "block") and in some cases, the packet unit does not coincide with each other, and the packet spreads over a plurality of blocks or a plurality of packets are present in one block. There are a fixed length packet and a variable length packet as classification of packets; the packet in the block is the variable length packet.

Here, in the transmission stream, a frame includes a plurality of blocks, and data is transmitted in a frame unit. For example, in FIG. 1, the transmission stream includes a plurality of blocks such as blocks M to M+5; focusing on the block M+1, in addition to a packet N, a part of packets N−1 and N+1 before and after the same are included therein. Furthermore, focusing on the block M+2, in addition to packets N+2 and N+3, a part of packets N+1 and N+4 before and after the same are included therein.

In this manner, for example, the packet N+1 is arranged so as to spread over the block M+1 and the block M+2, and a plurality of packets such as the packet N+2 and packet N+3 is present in the block M+2, so that there is a mismatch between the block unit and the packet unit.

Furthermore, the packet arranged in the block includes a header part and a data part in general. Various parameters are stored in the header part. Furthermore, in the data part, video and audio data and the like are stored.

The parameters stored in the header part of the packet include, for example, a data length of (the data part of) the packet. Furthermore, in the transmission stream, system control information including the various parameters is transmitted. The reception device shapes the data extracted from the block into the packet units to output using the data length obtained from the header part of the packet and information indicating a boundary (break) of the packets included in the system control information, for example.

For example, a transmission scheme of advanced broadband satellite digital broadcasting (ARIB STD-B44) is formulated in Japan; in this transmission scheme, a type length value (TLV) packet is used as the variable length packet, and transmission control information (hereinafter referred to as transmission & multiplexing configuration control (TMCC) information) is used as the system control information. Accordingly, the reception device extracts the packet by using the data length obtained from the header of the TLV packet, the information indicating the boundary (break) of the packet obtained from the TMCC information and the like.

(Packet Configuration of Advanced BS)

Figure 2:
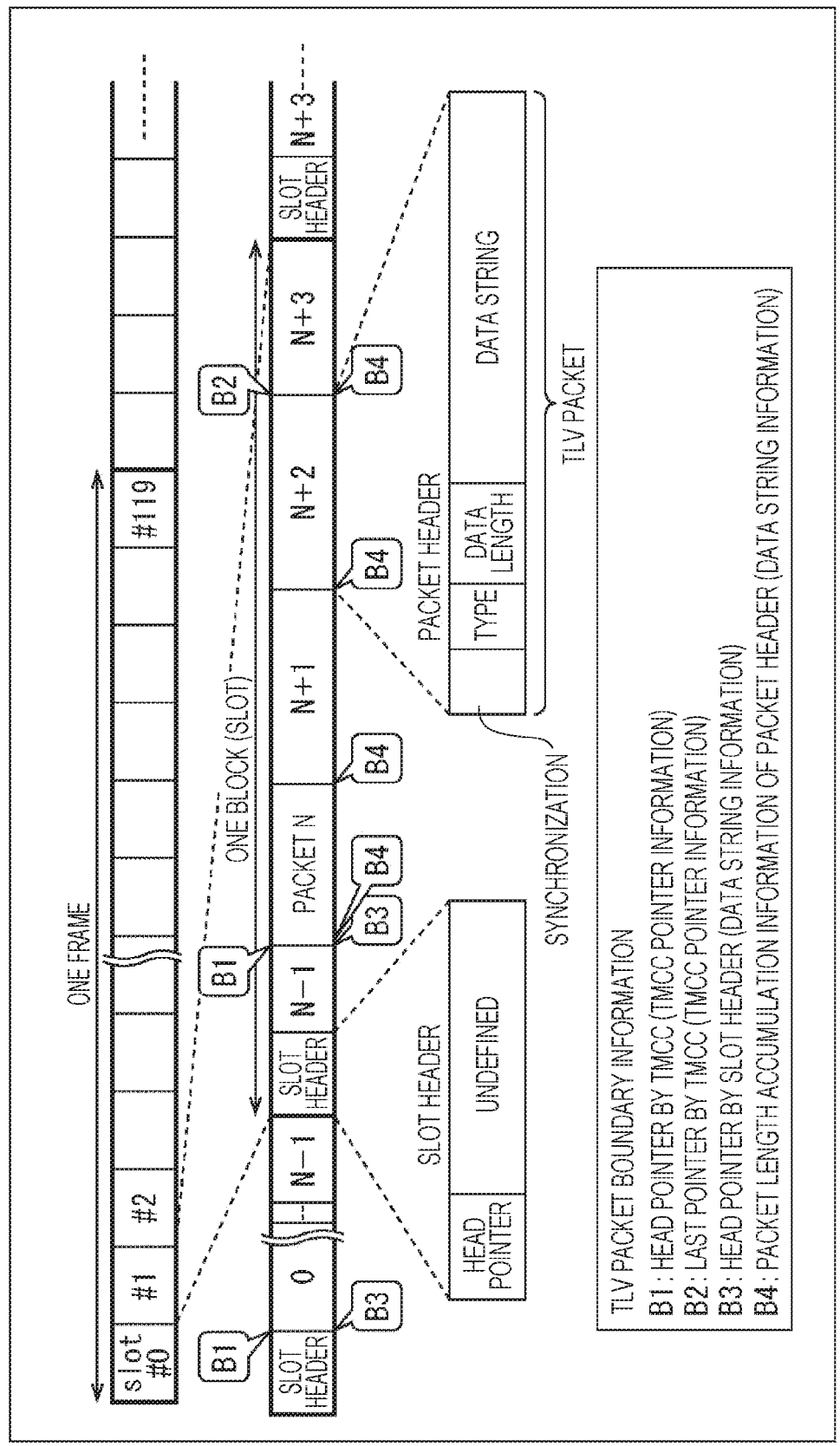
FIG. 2 is a view illustrating a configuration example of a packet of a transmission scheme of advanced broadband satellite digital broadcasting.

FIG. 2 is a view illustrating a configuration example of the packet in the transmission scheme of the advanced broadband satellite digital broadcasting.

In the transmission scheme of the advanced broadband satellite digital broadcasting of FIG. 2, the data is transmitted in the frame unit, and each frame includes a plurality of slots. For example, in FIG. 2, one frame includes slots #0 to #119. Note that, a slot header is added to each slot.

In other words, in FIG. 2, the block of error correction corresponds to the slot, and the TLV packet is arranged in each slot (block), but since a unit of the slot and a unit of the TLV packet do not coincide with each other, the TLV packet spreads over a plurality of slots and a plurality of TLV packets is arranged in one slot in some cases as described above.

Therefore, the reception device specifies the boundary (break) of the TLV packets in the slot by using the TMCC information included in the frame, information included in the slot header of the slot, and information included in a packet header of the TLV packet, thereby shaping the data extracted from the slot into the TLV packet units to output.

Here, the TMCC information includes boundary information of the TLV packets in addition to information required for decoding the transmission signal such as a modulation scheme and an error correction encoding rate. This packet boundary information includes information indicating positions of the TLV packet arranged at the head and the TLV packet arranged at the last among the TLV packets arranged in each slot.

In the following description, the information indicating the position of the TLV packet arranged at the head of the slot is referred to as a "head pointer B1", and the information indicating the position of the TLV packet arranged at the last of the slot is referred to as a "last pointer B2". Furthermore, the head pointer B1 and the last pointer B2 which are the packet boundary information obtained from the TMCC information are collectively referred to as "TMCC pointer information".

Furthermore, the slot header of the slot includes a head pointer B3. Like the head pointer B1 of the above-described TMCC information, this head pointer B3 is the information indicating the position of the TLV packet arranged at the head out of the TLV packets arranged in the slot.

Furthermore, the packet header of the TLV packet includes synchronization information, type information, and the data length. By using this data length, if the position of the head TLV packet is specified by using the head pointer B1 (head pointer B3) in a certain slot, for example, it is possible to specify a position of a next TLV packet by accumulating to hold a packet length of each TLV packet. Furthermore, using this accumulated packet length makes it possible to specify the position of the TLV packet in a next slot even in a case where the TLV packet is arranged to spread over the next slot.

In the following description, information obtained by accumulating the packet length of each TLV packet is referred to as "packet length accumulation information B4". Furthermore, the head pointer B3 obtained from the slot header of the slot and the packet length accumulation information B4 obtained from the packet header of the TLV packet being the packet boundary information obtained from a data string after the decoding processing are collectively referred to as "data string information".

Furthermore, the TMCC pointer information and the data string information are collectively referred to as "TLV packet boundary information". In other words, the TLV packet boundary information is the information for specifying the boundary (break) of the TLV packets in the slot and includes the head pointer B1 and the last pointer B2 as the TMCC pointer information and the head pointer B3 and the packet length accumulation information B4 as the data string information.

Specifically, in FIG. 2, focusing on the slot #1 included in the frame, the position of the head TLV packet N (position of the boundary between the TLV packet N−1 and the TLV packet N) is specified by the head pointer B1 of the TMCC pointer information or the head pointer B3 of the data string information. Note that, although the TLV packet N−1 is arranged so as to spread from the slot #0 immediately before, the position of the head TLV packet N may also be specified by the packet length accumulation information B4.

In the slot #1, the TLV packets N+1, N+2, and N+3 are sequentially arranged next to the TLV packet N, and the positions of the TLV packets N+1, N+2, and N+3 are specified by the packet length accumulation information B4. Furthermore, since the TLV packet N+3 is the TLV packet arranged so as to spread over the slot #1 and the slot #2 and is the TLV packet arranged at the last of the slot #1, the position thereof (position of the boundary between the TLV packet N+2 and the TLV packet N+3) is also specified by the last pointer B2.

In this manner, the reception device may shape the data extracted from the slot into the TLV packet units to output by specifying the boundary (break) of the TLV packets in the slot by using the TLV packet boundary information (head pointer B1, last pointer B2, head pointer B3, or packet length accumulation information B4).

Note that, when comparing robustness of the TMCC pointer information and that of the data string information, the robustness of the TMCC pointer information is higher than that of the data string information. Accordingly, the TMCC pointer information with higher error resistance is preferentially used in general.

(TMCC Information of Advanced BS)

Figure 3:
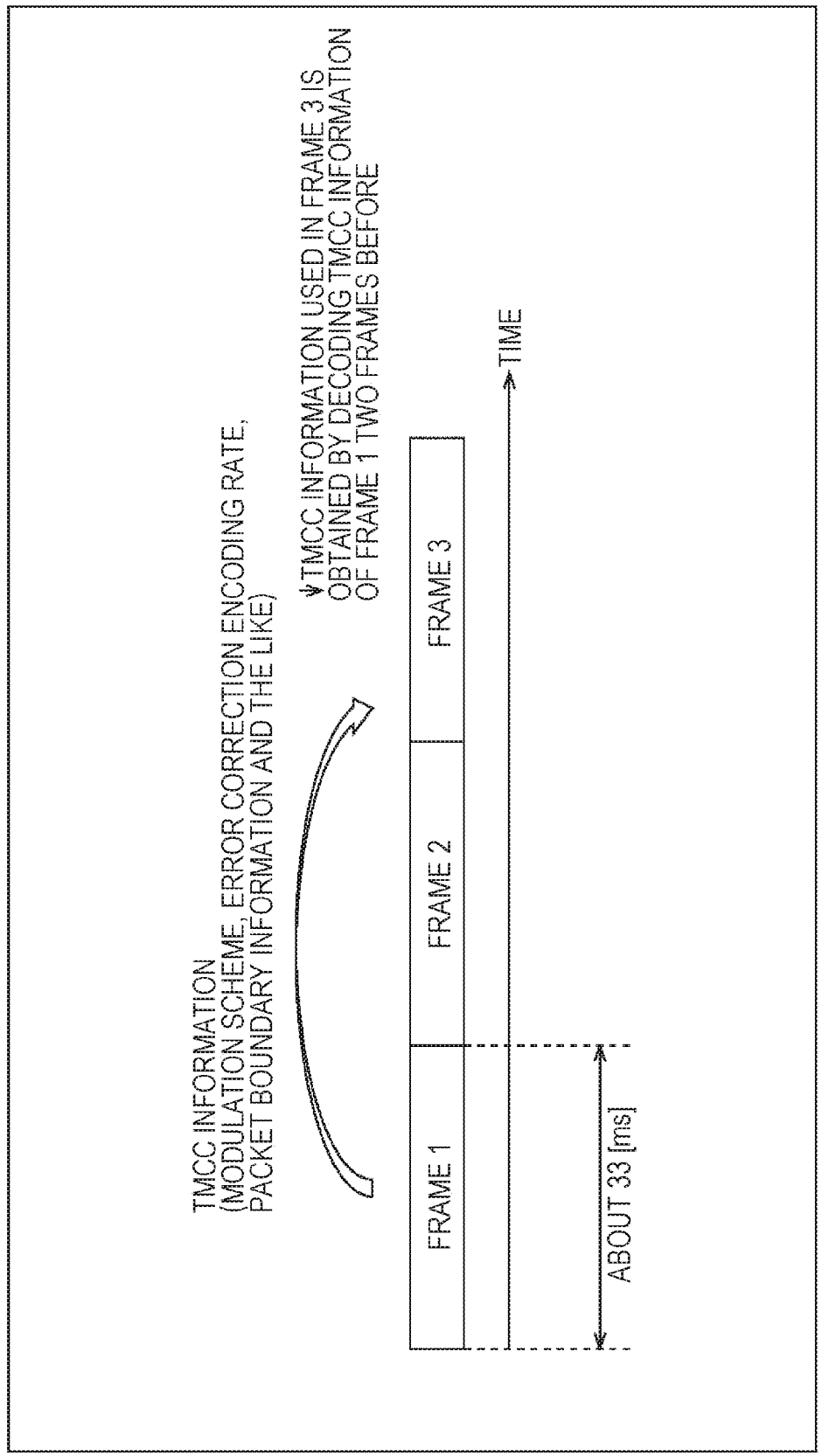
FIG. 3 is a view for illustrating a target frame of TMCC information.

FIG. 3 is a view for illustrating a target frame of the TMCC information.

In FIG. 3, the frames to be transmitted are represented in time series; the TMCC information is included in each frame, and the reception device performs the decoding processing such as demodulation processing and error correction decoding processing on the basis of the TMCC information. Here, the TMCC information roughly includes two types of information. One is information necessary for the decoding processing (demodulation processing, error correction decoding processing and the like) such as the modulation scheme and the error correction encoding rate, and the other is information necessary for dividing the multiplexed stream, in other words, the TLV packet boundary information.

The TMCC information includes information regarding a frame two frames after the frame from which the information is extracted. For example, in FIG. 3, the TMCC information used in a frame 3 is obtained by decoding the TMCC information extracted from a frame 1 two frames before the same.

Therefore, in the reception device, in a case where information obtained by analyzing the TMCC information is used in the decoding processing or the division processing of the multiplexed stream, waiting time by two frames occurs. For example, in a case where a frame length of one frame is about 33 ms, when a reception channel (broadcasting station) of the advanced broadband satellite digital broadcasting is switched by a user, the waiting time by two frames of about 66 ms is required.

(Configuration of Current Reception Device)

Figure 4:
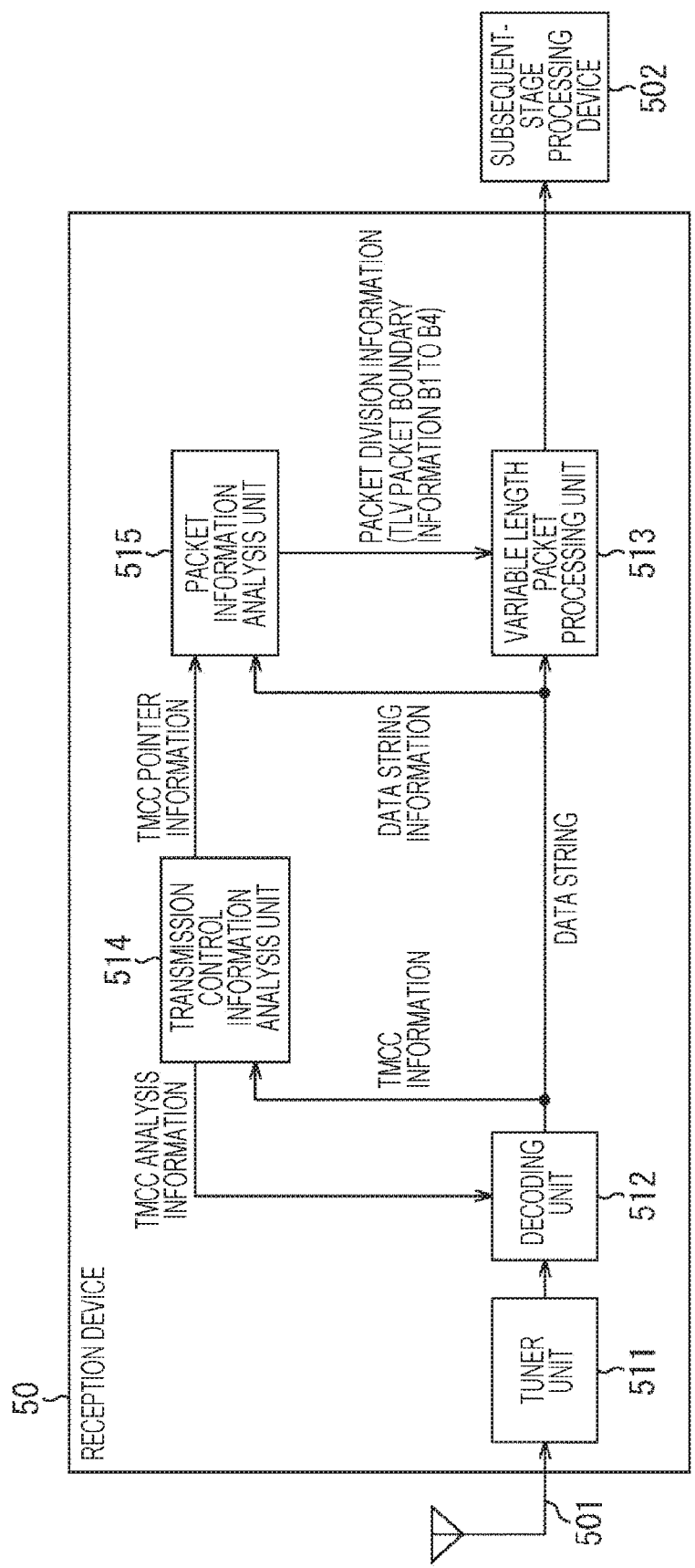
FIG. 4 is a view illustrating a configuration of a current reception device.

FIG. 4 is a view illustrating a configuration of a current reception device 50.

In FIG. 4, the reception device 50 includes a tuner unit 511, a decoding unit 512, a variable length packet processing unit 513, a transmission control information analysis unit 514, and a packet information analysis unit 515.

The tuner unit 511 connected to an antenna 501 receives a transmission signal transmitted from a transmission device (not illustrated) and supplies the same to the decoding unit 512.

On the basis of the TMCC analysis information supplied from the transmission control information analysis unit 514, the decoding unit 512 performs the decoding processing such as the demodulation processing and the error correction encoding processing on the transmission signal supplied from the tuner unit 511.

The variable length packet processing unit 513 performs packet processing on the multiplexed stream (data string) supplied from the decoding unit 512 on the basis of the packet division information supplied from the packet information analysis unit 515.

In this packet processing, the boundary (break) of the TLV packets in the slot is specified using the packet division information (TLV packet boundary information), and the data extracted from the slot is shaped into the TLV packet units. The TLV packet obtained by the packet processing is output to a subsequent-stage processing device 502 which performs processing such as decoding, for example.

The transmission control information analysis unit 514 analyzes the TMCC information obtained by the decoding processing by the decoding unit 512 and supplies (sets) an analysis result (TMCC analysis information) to the decoding unit 512. Furthermore, the transmission control information analysis unit 514 supplies the TMCC pointer information obtained by analyzing the TMCC information to the packet information analysis unit 515.

The packet information analysis unit 515 analyzes the TMCC pointer information supplied from the transmission control information analysis unit 514 and the data string information obtained from the data string output from the decoding unit 512, and supplies (sets) the same to the variable length packet processing unit 513 as the packet division information.

(Current Parameter Setting Processing)

Figure 5:
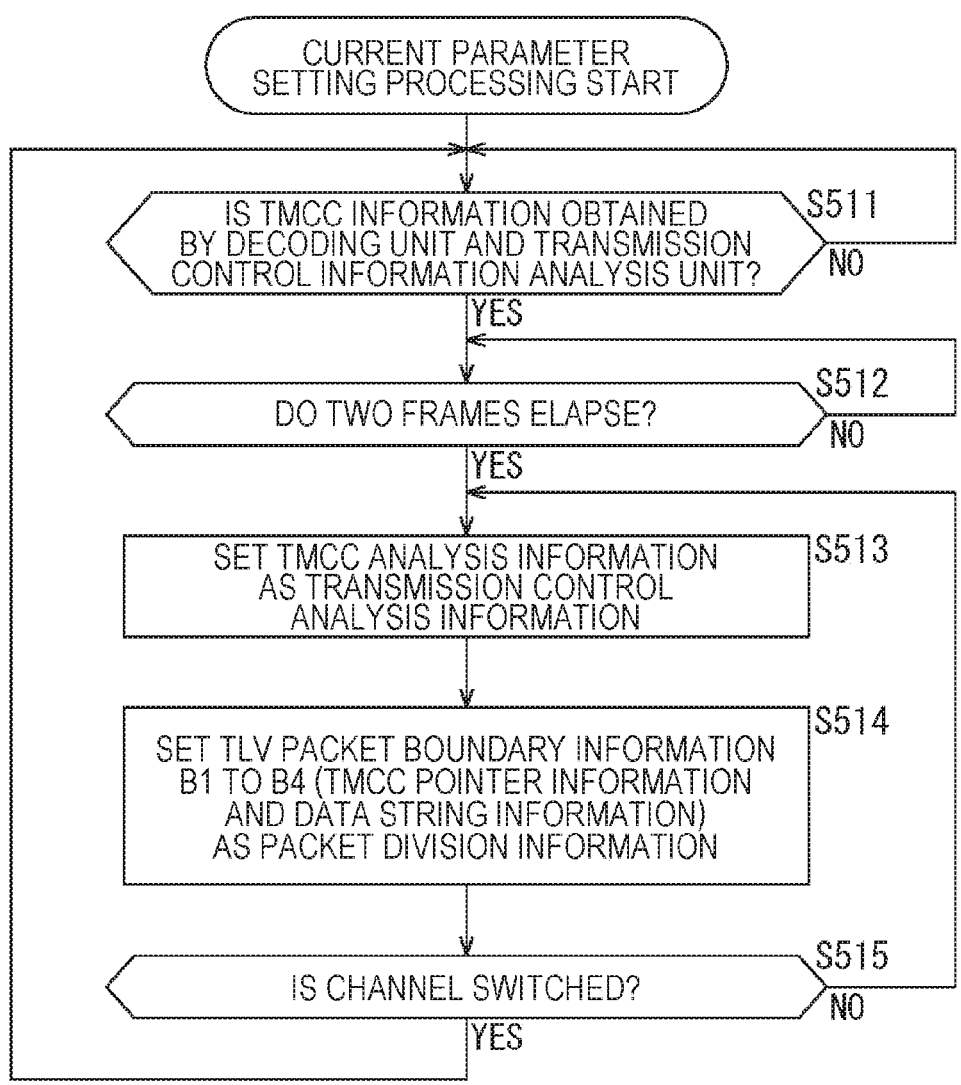
FIG. 5 is a flowchart for illustrating a flow of current parameter setting processing.

Next, a flow of current parameter setting processing executed by the reception device 50 of FIG. 4 is described with reference to a flowchart of FIG. 5.

At step S511, the transmission control information analysis unit 514 determines whether the decoding unit 512 and the transmission control information analysis unit 514 obtain the TMCC information. In a case where it is determined at step S511 that the TMCC information is not obtained, determination processing at step S511 is repeated. Then, in a case where it is determined at step S511 that the TMCC information is obtained, the procedure shifts to step S512.

At step S512, the transmission control information analysis unit 514 determines whether two frames elapse from the frame from which the TMCC information is obtained in the processing at step S511. In a case where it is determined at step S512 that two frames do not elapse, the determination processing at step S512 is repeated. Then, in a case where it is determined at step S512 that two frames elapse, the procedure shifts to step S513.

At step S513, the transmission control information analysis unit 514 sets the TMCC analysis information as the transmission control analysis information to the decoding unit 512. As a result, the decoding unit 512 performs the decoding processing using the TMCC analysis information set in the processing at step S513.

At step S514, the packet information analysis unit 515 sets the TMCC pointer information (head pointer B1 and last pointer B2) and the data string information (head pointer B3 and packet length accumulation information B4) to the variable length packet processing unit 513 as the packet division information. As a result, in the variable length packet processing unit 513, the boundary of the TLV packets in the slot is specified using the TLV packet boundary information set in the processing at step S514 and the data in the slot is shaped into the TLV packet units to be output.

At step S515, it is determined whether the user switches the reception channel. In a case where it is determined at step S515 that the reception channel is not switched, the procedure returns to step S513 and the above-described processing is repeated. On the other hand, in a case where it is determined at step S515 that the reception channel is switched, the procedure returns to step S511 and the above-described processing is repeated.

The flow of the current parameter setting processing is described above. In the current parameter setting processing, in order to use the TMCC information, it is necessary to wait until two frames elapse from the frame from which the TMCC information is obtained (S512). Therefore, a proposal is requested to eliminate such waiting time of frames and shorten time until the TLV packet is output.

There is also a method in which the TMCC information is held in advance and the TMCC information held in advance is used as preset information when the reception channel is switched in the reception device 50. For example, in Patent Document 1 described above, the applicant of the present invention proposes a method of shortening rising time of the reception device by using the information necessary for decoding the transmission signal out of the TMCC information as the preset information.

Such method is effective for information considered to be less likely to change in one channel such as information necessary for decoding the transmission signal; however, it is difficult to hold information difficult to be predicted in advance (information changing for each frame) such as the above-described packet division information as the preset information.

In the present technology, in view of such a situation, the technology of eliminating the waiting time of the frame and shorten the time until the packet (TLV packet) is output even in a case where the packet division information difficult to be predicted in advance is included as the transmission control information (TMCC information) is proposed. Specific contents of the present technology are hereinafter described.

<2. Configuration of Present Technology>

(1) System Configuration (Configuration Example of Transmission System)

Figure 6:
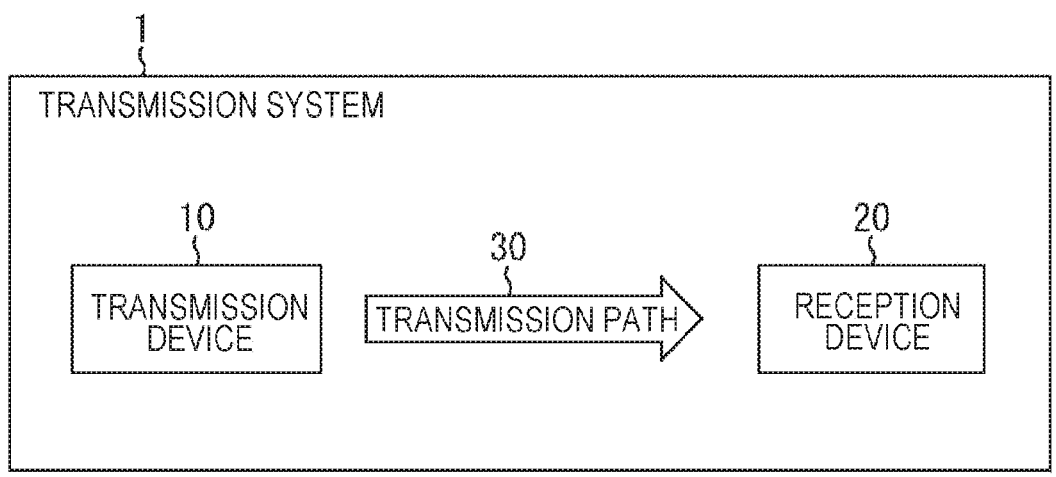
FIG. 6 is a view illustrating a configuration of an embodiment of a transmission system to which the present technology is applied.

FIG. 6 is a view illustrating a configuration of one embodiment of the transmission system to which the present technology is applied. Note that, a system is intended to mean a logical aggregation of a plurality of devices.

In FIG. 6, a transmission system 1 includes a transmission device 10 and a reception device 20. In this transmission system 1, data transmission complying with the standard of the digital broadcasting such as the advanced broadband satellite digital broadcasting is performed.

The transmission device 10 processes the multiplexed stream obtained by multiplexing video and audio data of contents (for example, a broadcast program, a commercial and the like) and transmits the same as a transmission signal via a transmission path 30.

The reception device 20 receives the transmission signal transmitted from the transmission device 10 via the transmission path 30. The reception device 20 reproduces the video and audio of the contents (for example, the broadcast program, commercial and the like) from the multiplexed stream obtained by processing the transmission signal.

Note that, in the transmission system 1, the transmission path 30 may be, for example, terrestrial broadcasting and cable broadcasting (CATV) using a cable in addition to satellite broadcasting using a broadcasting satellite (BS) or a communications satellite (CS).

(Configuration Example of Reception Device)

Figure 7:
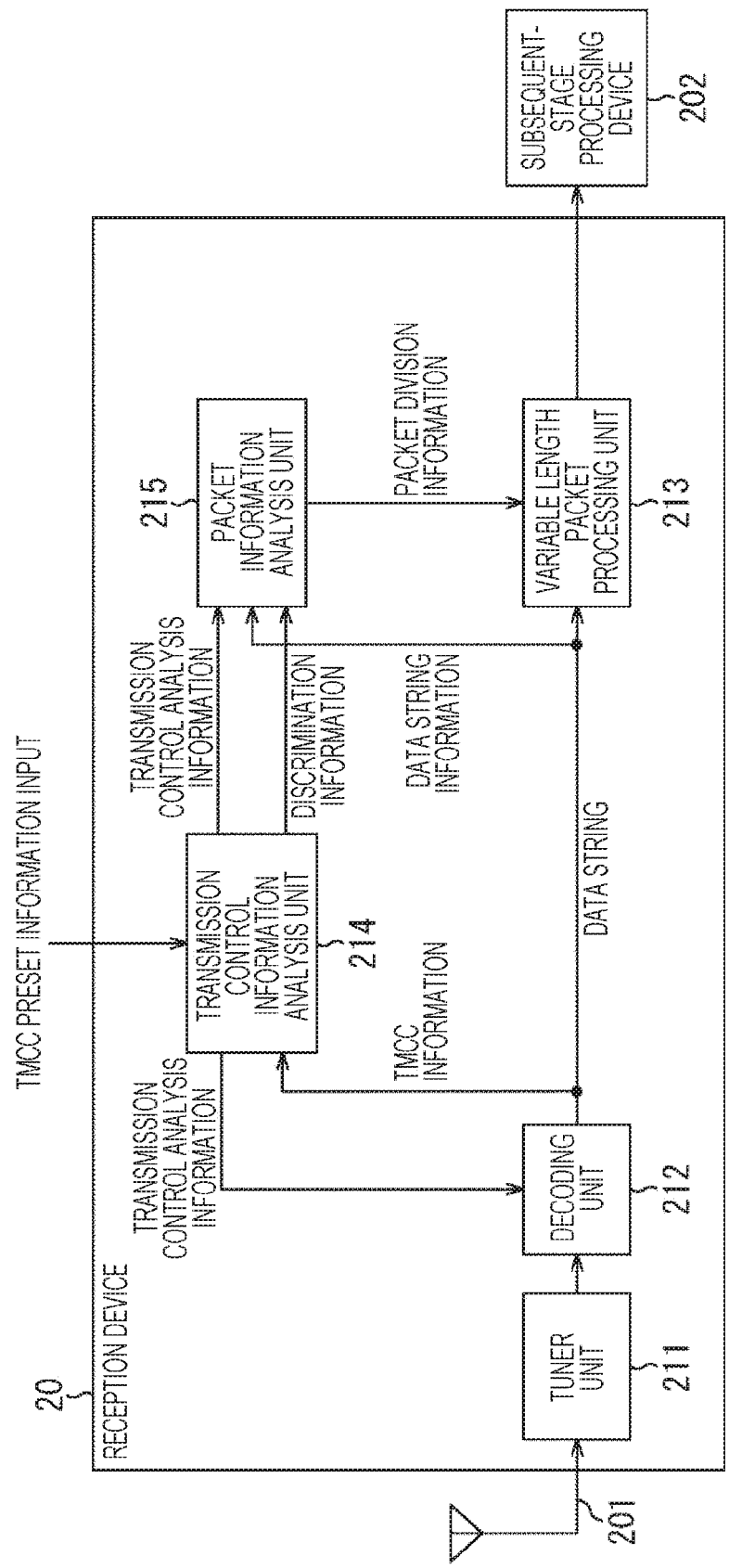
FIG. 7 is a view illustrating a configuration example of a reception device.

FIG. 7 is a view illustrating a configuration example of the reception device 20 in FIG. 6.

In FIG. 7, the reception device 20 includes a tuner unit 211, a decoding unit 212, a variable length packet processing unit 213, a transmission control information analysis unit 214, and a packet information analysis unit 215.

The tuner unit 211 connected to an antenna 201 receives the transmission signal transmitted from the transmission device 10 through the antenna 201 and supplies the same to the decoding unit 212.

On the basis of the transmission control analysis information supplied from the transmission control information analysis unit 214, the decoding unit 212 performs the decoding processing such as the demodulation processing and the error correction decoding processing on the transmission signal supplied from the tuner unit 211. By this decoding processing, the data string and the TMCC information are decoded (extracted) from the frame, the data string is supplied to the variable length packet processing unit 213, and the TMCC information is supplied to the transmission control information analysis unit 214.

The variable length packet processing unit 213 performs the packet processing on the multiplexed stream (data string) supplied from the decoding unit 212 on the basis of the packet division information supplied from the packet information analysis unit 215. In this packet processing, the boundary (break) of the TLV packets in the slot is specified using the packet division information (TLV packet boundary information), and the data extracted from the slot is shaped into the TLV packet units. The TLV packet obtained by the packet processing is output to a subsequent-stage processing device 202 which performs processing such as decoding, for example.

The transmission control information analysis unit 214 analyzes the transmission control information and supplies (sets) an analysis result (transmission control analysis information) to the decoding unit 212. Furthermore, the transmission control information analysis unit 214 supplies the transmission control analysis information to the packet information analysis unit 215. As the transmission control information, there are the TMCC information obtained by the decoding processing by the decoding unit 212 and TMCC preset information externally input, and the pieces of information are analyzed by the transmission control information analysis unit 214.

Here, the TMCC preset information includes only information (known information) necessary for the decoding processing (demodulation processing, error correction decoding processing and the like) such as the modulation scheme and the error correction encoding rate out of the TMCC information. In other words, the TMCC preset information does not include the TLV packet boundary information necessary for dividing the multiplexed stream which is difficult to predict in advance. The TMCC preset information is held in advance in the reception device 20 by, for example, initial scanning processing and the like.

Further, the transmission control information analysis unit 214 monitors the decoding processing by the decoding unit 212, thereby performing the determination processing whether two frames elapse from the frame from which the TMCC information is obtained. A result of the determination processing is supplied to the packet information analysis unit 215 as discrimination information for discriminating the frame to be processed.

The packet information analysis unit 215 analyzes the transmission control analysis information (TMCC pointer information) supplied from the transmission control information analysis unit 214 and the data string information obtained from the data string output from the decoding unit 212. The packet information analysis unit 215 supplies (sets) the packet division information to the variable length packet processing unit 213 on the basis of the discrimination information supplied from the transmission control information analysis unit 214.

Here, as the packet division information, the packet division information according to at least one of the transmission control analysis information (TMCC pointer information) or the data string information is set. Note that, it is herein described that the packet information analysis unit 215 sets the packet division information to the variable length packet processing unit 213, and this "setting" includes a case where the packet division information stored by the packet information analysis unit 215 is read (obtained) by the variable length packet processing unit 213.

The reception device 20 is configured in the above-described manner. Here, the reception device 20 of FIG. 7 operates differently depending on whether or not two frames elapse after the TMCC information is obtained. Therefore, the configuration of the reception device 20 before two frames elapse and after two frames elapse after the TMCC information is obtained is next described with reference to FIGS. 8 and 9.

(Configuration Example of Reception Device Before Two Frames Elapse after TMCC Information is Obtained)

Figure 8:
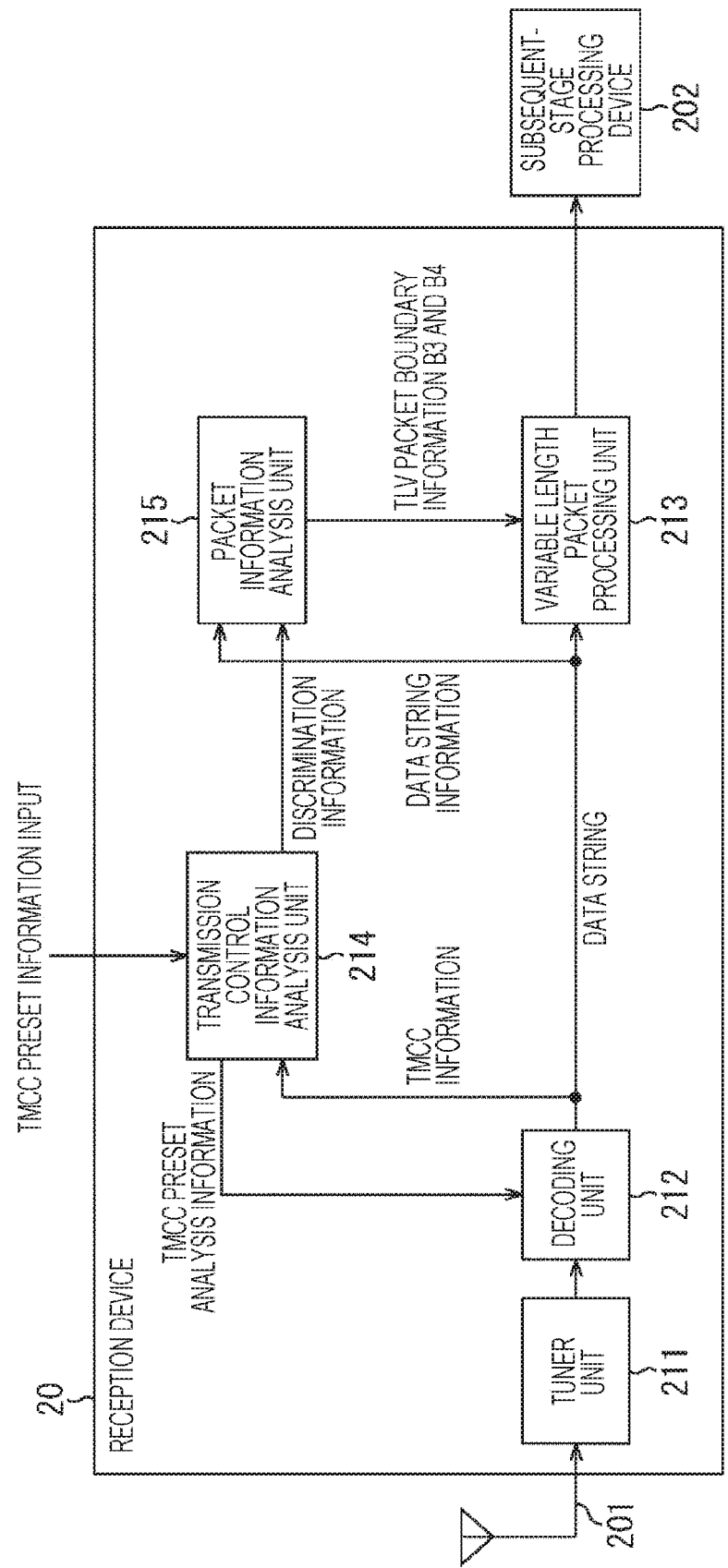
FIG. 8 is a view illustrating a configuration example of the reception device before two frames elapse after the TMCC information is obtained.

First, with reference to FIG. 8, the configuration of the reception device 20 before two frames elapse after the TMCC information is obtained is described.

In FIG. 8, the transmission control information analysis unit 214 analyzes the TMCC preset information as the transmission control information. Then, the transmission control information analysis unit 214 sets TMCC preset analysis information as the transmission control analysis information to the decoding unit 212. As a result, the decoding unit 212 performs the decoding processing using the TMCC preset analysis information set by the transmission control information analysis unit 214.

Note that, in this case, since the TMCC preset information does not include the TLV packet boundary information necessary for dividing the multiplexed stream, the transmission control analysis information (TMCC pointer information) is never supplied from the transmission control information analysis unit 214 to the packet information analysis unit 215.

In FIG. 8, the packet information analysis unit 215 analyzes the data string information obtained from the data string output from the decoding unit 212. Then, the packet information analysis unit 215 sets the data string information (head pointer B3 and packet length accumulation information B4) as the packet division information to the variable length packet processing unit 213. As a result, the variable length packet processing unit 213 performs the packet processing using the data string information (head pointer B3 and packet length accumulation information B4).

As described above, in the reception device 20, after the TMCC information is obtained and before two frames elapse, the TMCC preset analysis information is set as the transmission control analysis information, and the data string information (head pointer B3 and packet length accumulation information B4) is set as the packet division information.

(Configuration Example of Reception Device after Two Frames Elapse after TMCC Information is Obtained)

Figure 9:
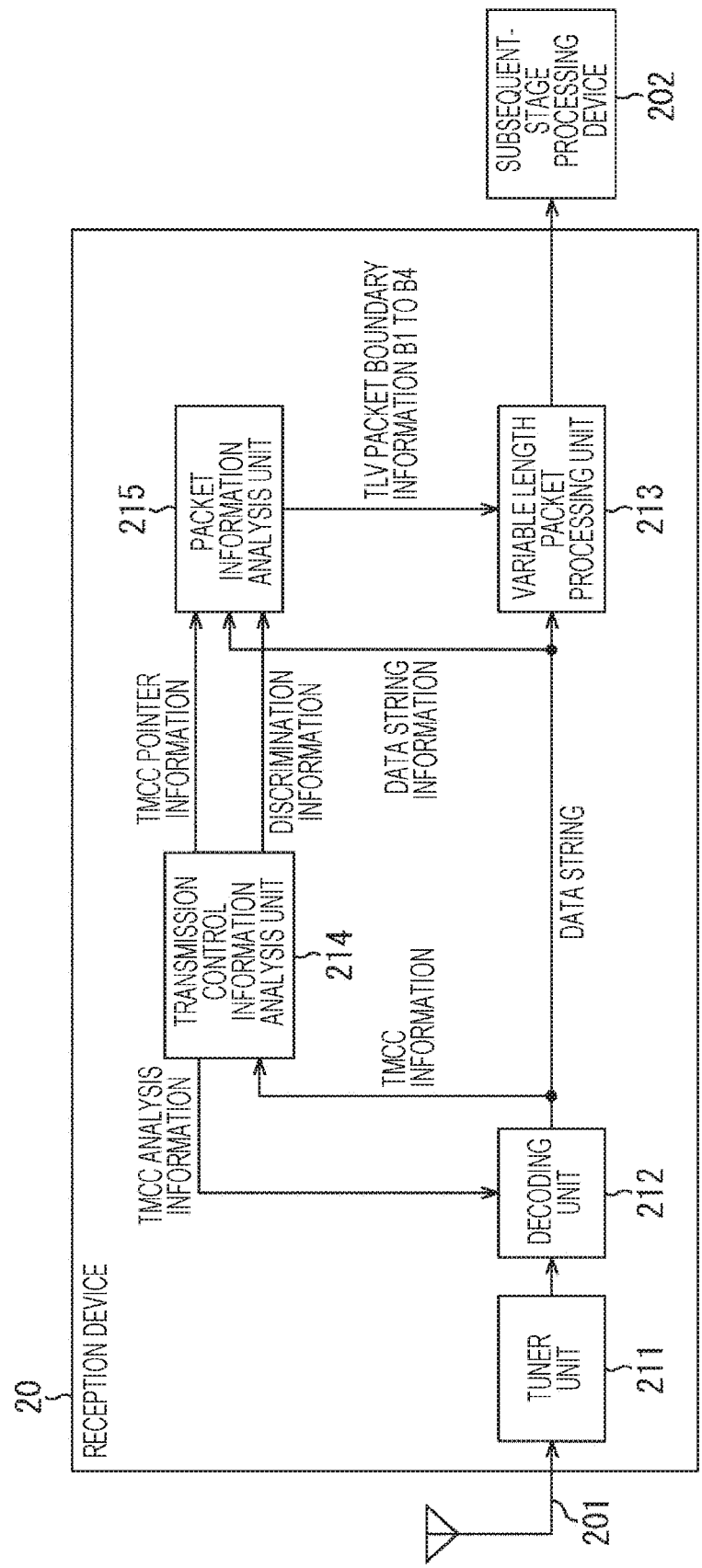
FIG. 9 is a view illustrating a configuration example of the reception device after two frames elapse after the TMCC information is obtained.

Next, with reference to FIG. 9, the configuration of the reception device 20 after two frames elapse after the TMCC information is obtained is described.

In FIG. 9, the transmission control information analysis unit 214 analyzes the TMCC information as the transmission control information. Then, the transmission control information analysis unit 214 sets the TMCC analysis information as the transmission control analysis information to the decoding unit 212. As a result, the decoding unit 212 performs the decoding processing using the TMCC analysis information set by the transmission control information analysis unit 214.

Furthermore, the transmission control information analysis unit 214 supplies the TMCC pointer information as the transmission control analysis information to the packet information analysis unit 215. Moreover, the transmission control information analysis unit 214 monitors the decoding processing by the decoding unit 212, so that when two frames elapse from the frame from which the TMCC information is obtained, this supplies the discrimination information notifying of this to the packet information analysis unit 215.

In FIG. 9, the packet information analysis unit 215 analyzes the TMCC pointer information supplied from the transmission control information analysis unit 214 and the data string information obtained from the data string output from the decoding unit 212. Then, in a case where the discrimination information supplied from the transmission control information analysis unit 214 indicates that two frames elapse from the frame from which the TMCC information is obtained, the packet information analysis unit 215 sets the TMCC pointer information (head pointer B1 and last pointer B2) and the data string information (head pointer B3 and packet length accumulation information B4) to the variable length packet processing unit 213 as the packet division information.

As a result, the variable length packet processing unit 213 performs the packet processing using the TMCC pointer information (head pointer B1 and last pointer B2) and the data string information (head pointer B3 and packet length accumulation information B4).

As described above, in the reception device 20, after the TMCC information is obtained and after two frames elapse, the TMCC analysis information is set as the transmission control analysis information, and the TMCC pointer information (head pointer B1 and last pointer B2) and the data string information (head pointer B3 and packet length accumulation information B4) are set as the packet division information.

(2) Flow of Processing on Reception Side

Next, with reference to FIGS. 10 to 13, a flow of processing executed by the reception device 20 on the reception side is described.

(Reception Processing of Present Technology)

Figure 10:
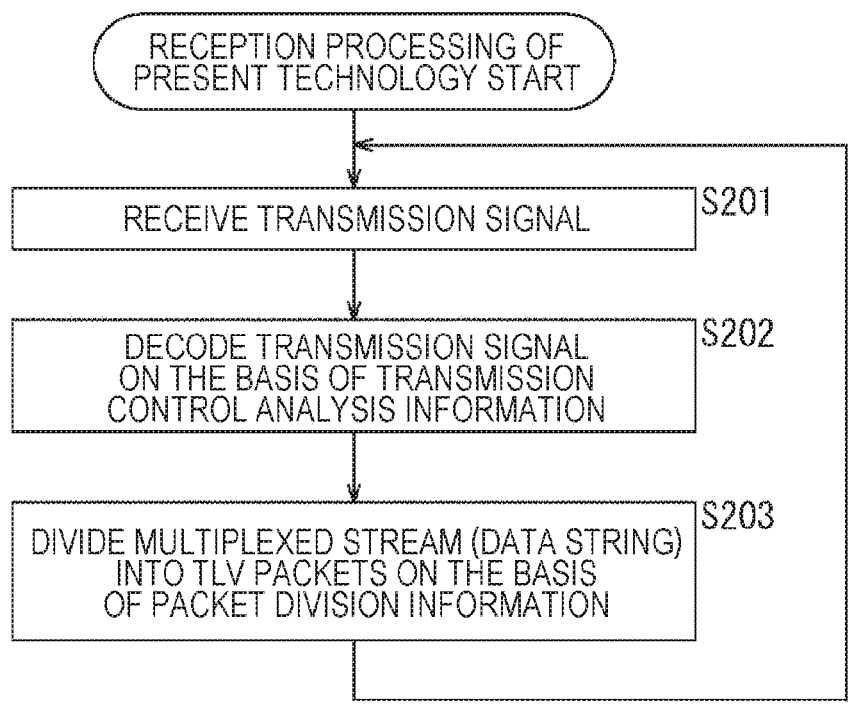
FIG. 10 is a flowchart for illustrating a flow of reception processing of the present technology.

First, with reference to a flowchart of FIG. 10, a flow of reception processing of the present technology executed by the reception device 20 of FIG. 6 is described.

At step S201, the tuner unit 211 receives the transmission signal transmitted from the transmission device 10 via the antenna 201.

At step S202, the decoding unit 212 decodes the transmission signal received in the processing at step S201 on the basis of the transmission control analysis information set by the transmission control information analysis unit 214. In this decoding processing, the processing such as the demodulation processing and the error correction decoding processing is performed using the transmission control analysis information.

Note that, although it is described later in detail with reference to a flowchart of FIG. 11, as the transmission control analysis information set by the transmission control information analysis unit 214, the TMCC preset analysis information or the TMCC analysis information is set depending on whether or not two frames elapse after the TMCC information is obtained.

At step S203, the packet information analysis unit 215 divides the multiplexed stream (data string) decoded in the processing at step S202 into the TLV packets on the basis of the packet division information set by the packet information analysis unit 215.

Note that, although it is described later in detail with reference to the flowchart of FIG. 11, as the packet division information set by the packet information analysis unit 215, the data string information (head pointer B3 and packet length accumulation information B4) or the TMCC pointer information (head pointer B1 and last pointer B2) and the data string information (head pointer B3 and packet length accumulation information B4) is set (dynamically switched) depending on whether or not two frames elapse after the TMCC information is obtained.

The flow of the reception processing of the present technology is described above.

(Parameter Setting Processing of Present Technology)

Figure 11:
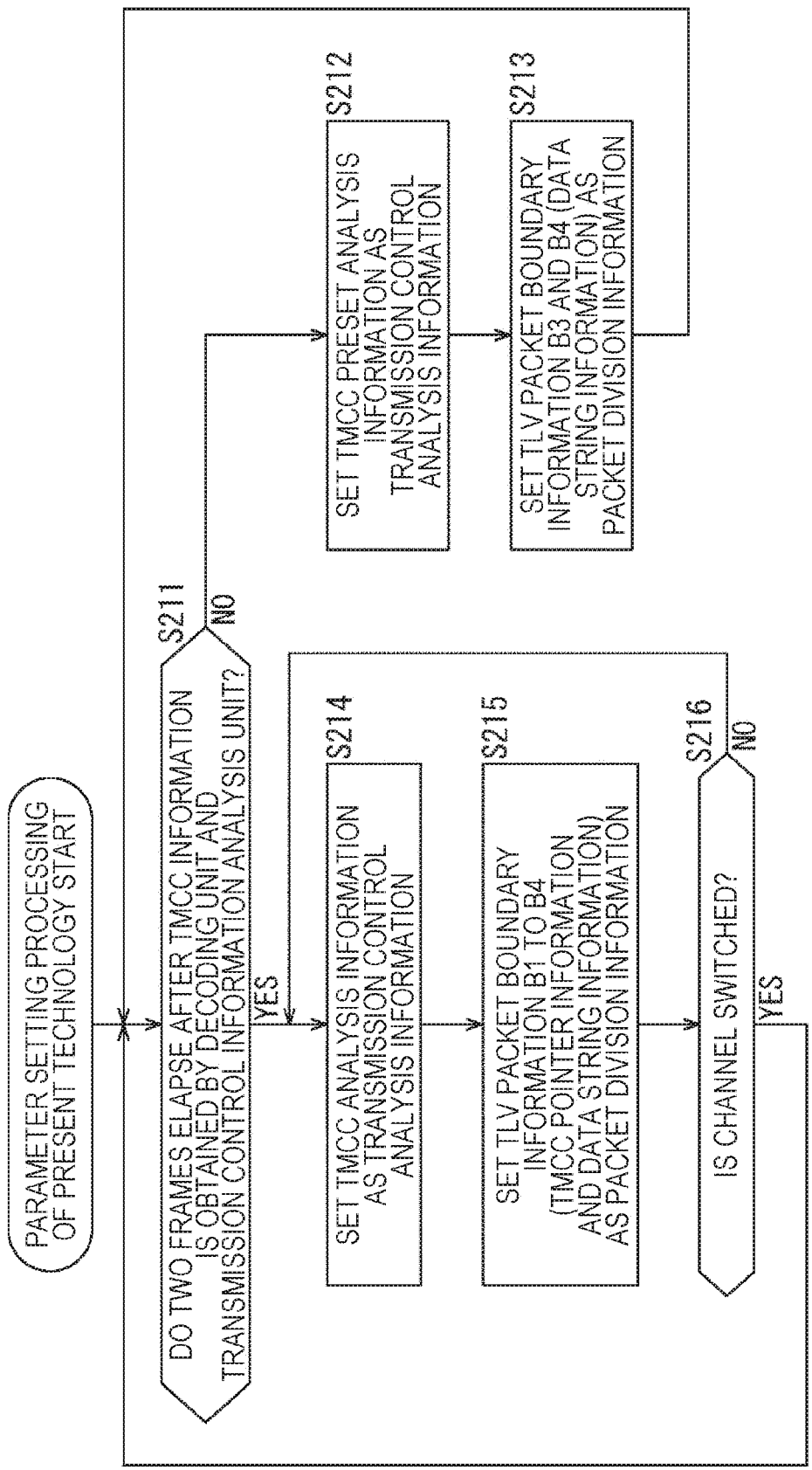
FIG. 11 is a flowchart for illustrating a flow of parameter setting processing of the present technology.

Next, with reference to the flowchart of FIG. 11, a flow of parameter setting processing of the present technology executed by the reception device 20 of FIG. 6 is described.

At step S211, the transmission control information analysis unit 214 determines whether two frames elapse after the TMCC information is obtained by the decoding unit 212 and the transmission control information analysis unit 214. In a case where it is determined at step S211 that two frames do not elapse after the TMCC information is obtained, the procedure shifts to step S212.

At step S212, the transmission control information analysis unit 214 sets the TMCC preset analysis information as the transmission control analysis information to the decoding unit 212. As a result, the decoding unit 212 performs the decoding processing using the TMCC preset analysis information set in the processing at step S212 (S202 of FIG. 10).

At step S213, the packet information analysis unit 215 sets the data string information (head pointer B3 and packet length accumulation information B4) as the packet division information to the variable length packet processing unit 213. As a result, the variable length packet processing unit 213 performs the packet processing using the packet division information (head pointer B3 and packet length accumulation information B4) set in the processing at step S213 (S203 of FIG. 10).

When the processing at step S213 is finished, the procedure shifts to step S211. In the determination processing at step S211, it is determined again whether two frames elapse after the TMCC information is obtained, and in a case where it is determined that two frames do not elapse, the processing at steps S212 and S213 is repeated.

In other words, the parameter setting processing is executed by the transmission control information analysis unit 214 and the packet information analysis unit 215, so that after the TMCC information is obtained and until two frames elapse, the decoding unit 212 performs the decoding processing using the TMCC preset analysis information, and the variable length packet processing unit 213 performs the packet processing using the data string information (head pointer B3 and packet length accumulation information B4).

Figure 12:
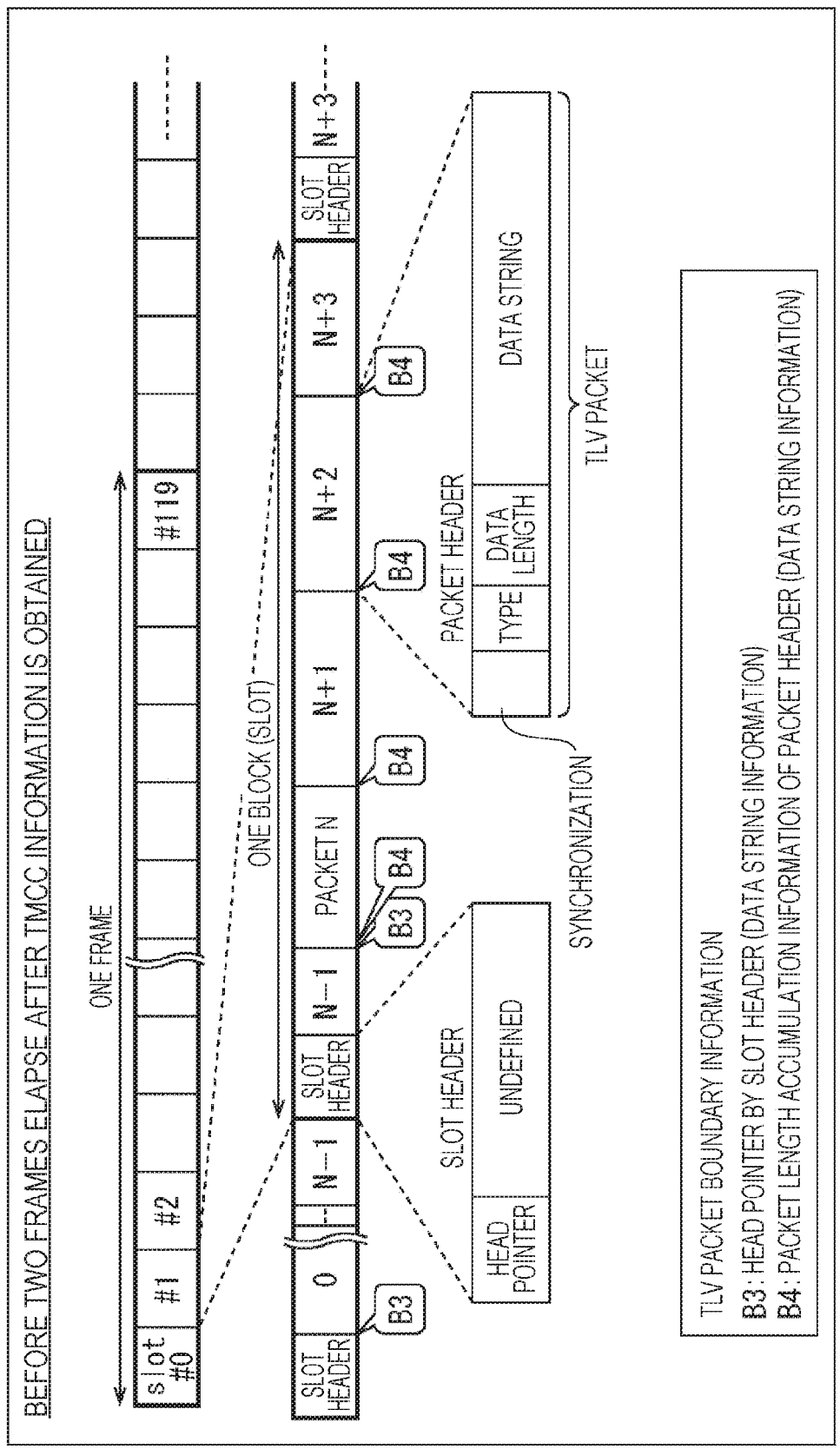
FIG. 12 is a view illustrating a setting example of TLV packet boundary information before two frames elapse after the TMCC information is obtained.

Specifically, as illustrated in FIG. 12, the packet information analysis unit 215 sets the head pointer B3 obtained from the slot header of the slot to be processed and the packet length accumulation information B4 obtained from the packet header of the TLV packet to be processed to the variable length packet processing unit 213 in the frame to be processed. Then, the variable length packet processing unit 213 shapes the data extracted from the slot into the TLV packet units by specifying the boundary (break) of the TLV packets in the slot by using the head pointer B3 and the packet length accumulation information B4.

Returning to the description of FIG. 11; on the other hand, in a case where it is determined that two frames elapse after the TMCC information is obtained at step S211 by repeating the processing at steps S211 to S213, the procedure shifts to step S214.

At step S214, the transmission control information analysis unit 214 sets the TMCC analysis information as the transmission control analysis information to the decoding unit 212. As a result, the decoding unit 212 performs the decoding processing using the TMCC analysis information set in the processing at step S214 (S202 of FIG. 10).

At step S215, the packet information analysis unit 215 sets the TMCC pointer information (head pointer B1 and last pointer B2) and the data string information (head pointer B3 and packet length accumulation information B4) to the variable length packet processing unit 213 as the packet division information. As a result, the variable length packet processing unit 213 performs the packet processing using the packet division information (head pointer B1, last pointer B2, head pointer B3, and packet length accumulation information B4) set in the processing at step S215 (S203 of FIG. 10).

When the processing at step S215 is finished, the procedure shifts to step S216. At step S216, it is determined whether the user switches the reception channel. In a case where it is determined at step S216 that the reception channel is not switched, the procedure returns to step S214 and the processing at steps S214 and S215 described above is repeated.

In other words, the parameter setting processing is executed by the transmission control information analysis unit 214 and the packet information analysis unit 215, so that after two frames elapse after the TMCC information is obtained and until the channel is switched, the decoding unit 212 performs the decoding processing using the TMCC analysis information, and the variable length packet processing unit 213 performs the packet processing using the TMCC pointer information (head pointer B1 and last pointer B2) and the data string information (head pointer B3 and packet length accumulation information B4).

Figure 13:
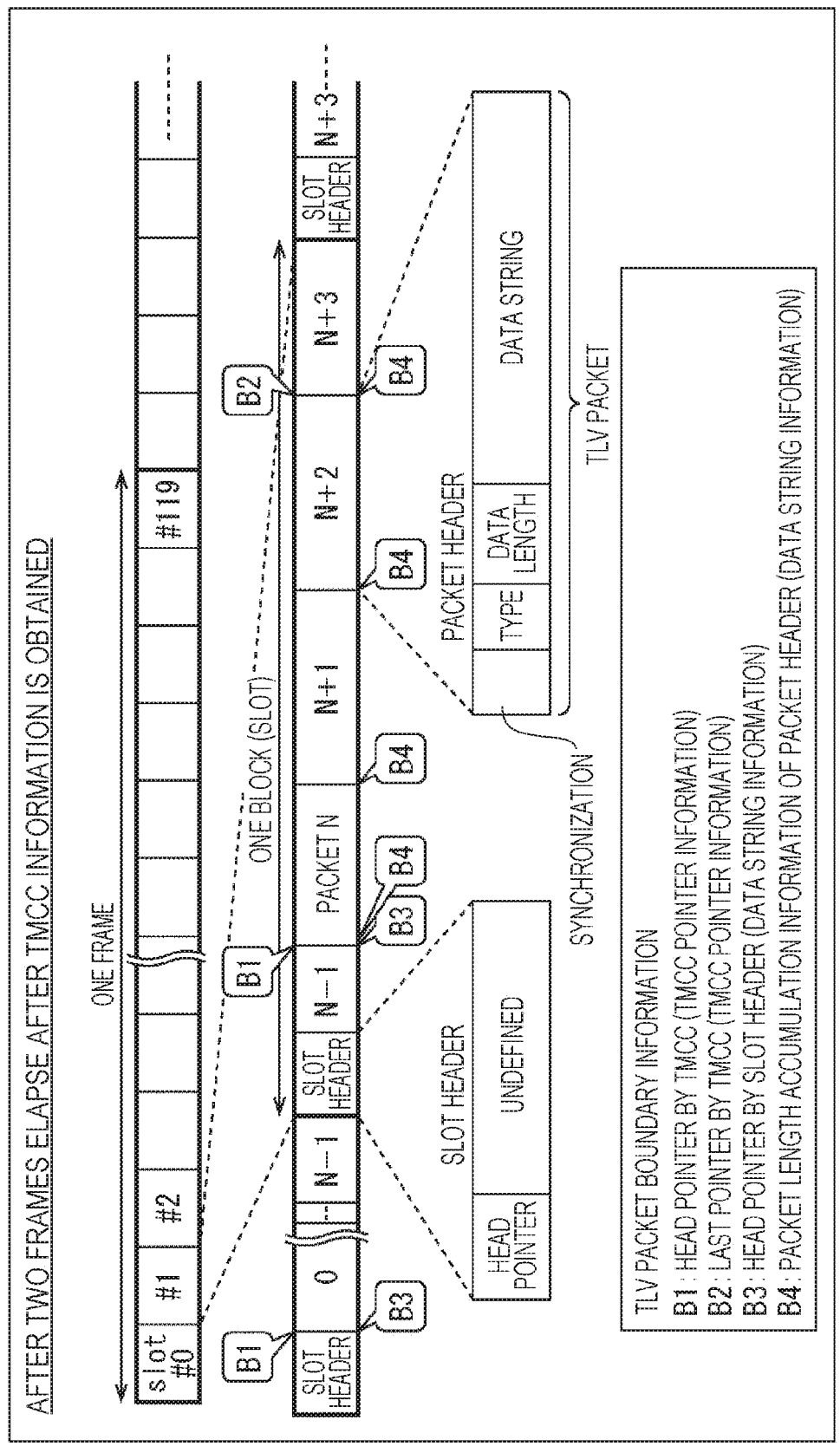
FIG. 13 is a view illustrating a setting example of the TLV packet boundary information after two frames elapse after the TMCC information is obtained.

Specifically, as illustrated in FIG. 13, the packet information analysis unit 215 sets the TMCC pointer information obtained from the TMCC information two frames before (head pointer B1 and last pointer B2), and the head pointer B3 obtained from the slot header of the slot to be processed and the packet length accumulation information B4 obtained from the packet header of the TLV packet to be processed in the frame to be processed to the variable length packet processing unit 213. Then, the variable length packet processing unit 213 shapes the data extracted from the slot into the TLV packet units to output by specifying the boundary (break) of the TLV packets in the slot by using the TMCC pointer information (head pointer B1 and last pointer B2) and the data string information (head pointer B3 and packet length accumulation information B4).

Returning to the description of FIG. 11, in a case where it is determined at step S216 that the reception channel is switched, the procedure returns to step S211 and the processing at steps S211 to S216 described above is repeated. In other words, in a case where the reception channel is switched to another channel, it is necessary to adjust deviation between the TMCC information and the frame illustrated in FIG. 3 again. Therefore, in this case, the determination processing at step S211 is performed again, and after the TMCC information is obtained and before two frames elapse, the processing at steps S212 to S213 is performed, and thereafter, after the TMCC information is obtained and after two frames elapse, the processing at steps S214 to S215 is performed.

That is, in a case where the TMCC pointer information is not obtained from the analysis result of the transmission control information (TMCC preset information or TMCC information) by the transmission control information analysis unit 214, the packet information analysis unit 215 sets only the data string information as the packet division information, and in a case where the TMCC pointer information is obtained from the analysis result of the transmission control information by the transmission control information analysis unit 214, this sets the TMCC pointer information as the packet division information. In other words, it may also be said that the data string information and the TMCC pointer information are dynamically switched as the packet division information.

The flow of the parameter setting processing of the present technology is described above. In the parameter setting processing of the present technology, it may be configured such that the decoding processing using the TMCC preset analysis information as the transmission control analysis information is performed and the packet processing (processing of detecting the boundary of the TLV packets) using the data string information (head pointer B3 and packet length accumulation information B4) as the packet division information is performed even before two frames elapse after the TMCC information is obtained.

Therefore, the waiting time of two frames occurring in a case where the above-described current parameter setting processing (FIG. 5) is applied does not occur, and it is possible to shorten the time until outputting the TLV packet. As a result, from the user, when switching the reception channel, an image of a switching destination is promptly displayed, so that the user does not feel stressed at the time of channel switching.

Furthermore, in the parameter setting processing of the present technology, after two frames elapse after the TMCC information is obtained, as the current parameter setting processing (FIG. 5), the decoding processing using the TMCC analysis information as the transmission control analysis information and the packet processing using the TMCC pointer information and the data string information as the packet division information are performed.

<3. Variation>

Although the transmission scheme of advanced broadband satellite digital broadcasting in Japan is described above as the standard of digital broadcasting, the present technology may also be applied to another transmission scheme of integrated services digital broadcasting (ISDB) which is the scheme adopted in Japan and the like, digital video broadcasting (DVB) which is the scheme adopted in countries in Europe and the like, and advanced television systems committee (ATSC) which is the scheme adopted in the United States or the like, for example.

Furthermore, as the standards for digital broadcasting, in addition to standards for satellite broadcasting using broadcasting satellite (BS), communications satellite (CS) and the like, this may also be applied to the standards such as terrestrial broadcasting and cable broadcasting such as cable television (CATV).

Note that, the above-described names of transmission control information (signaling) and packet are merely an example, and other names may be used in some cases. However, the difference between these names is a formal difference, and substantial contents of the target transmission control information, packet and the like are not different.

Furthermore, the present technology may also be applied to predetermined standards (standards other than standards of digital broadcasting) defined on the assumption of using a transmission path other than the broadcasting network, in other words, for example, a communication line (communication network) such as the Internet, telephone network, and the like as the transmission path. In this case, a communication line such as the Internet and telephone network is used as the transmission path 30 of the transmission system 1 (FIG. 6), and the transmission device 10 may be a server provided on the Internet. Then, the reception device 20 has a communication function, so that the transmission device 10 (server) performs the processing in response to a request from the reception device 20. On the other hand, the reception device 20 processes the data transmitted from the transmission device 10 (server) via the transmission path 30 (communication line).

<4. Computer Configuration>

Figure 14:
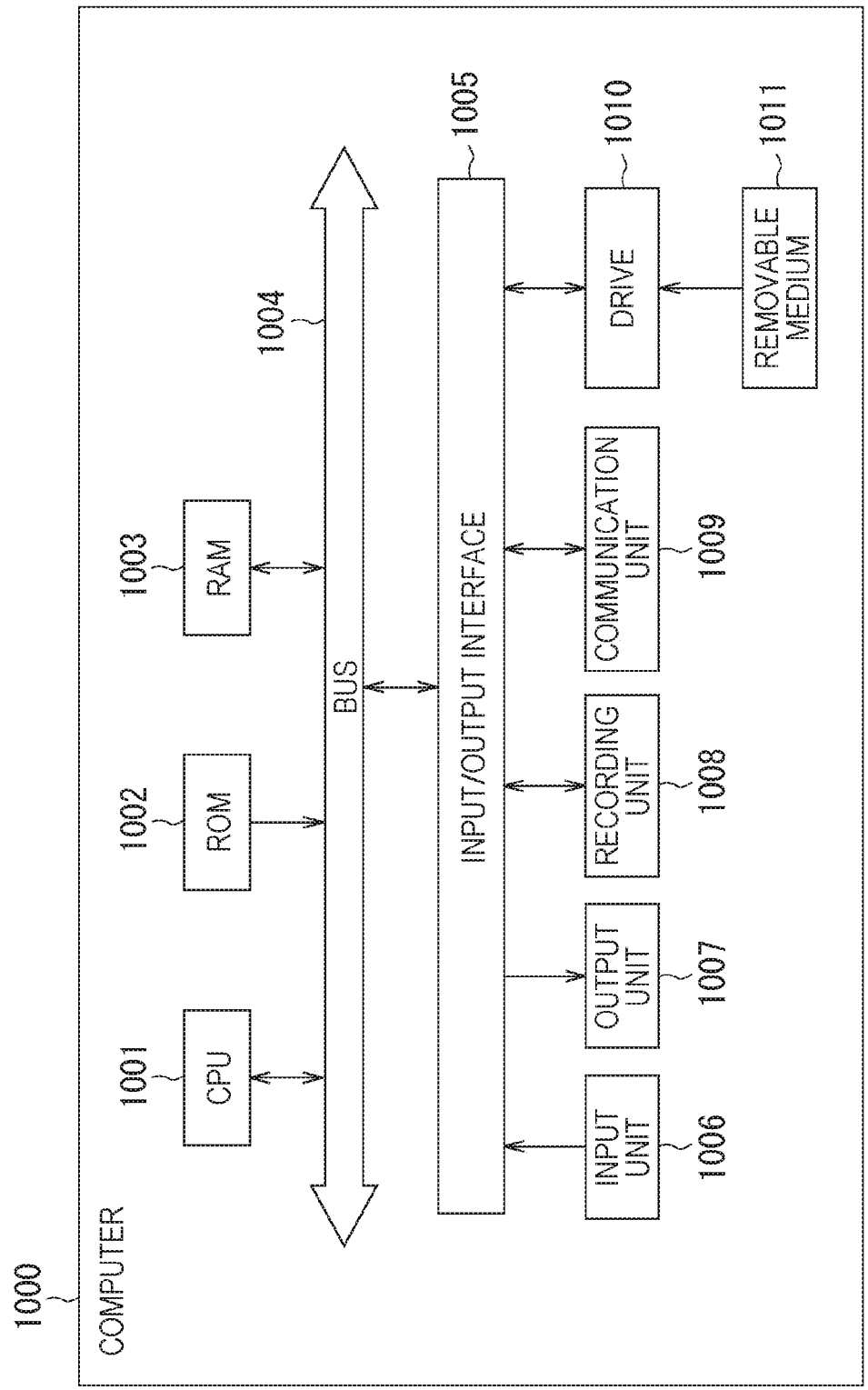
FIG. 14 is a view illustrating a configuration example of a computer.

The above-described series of processes may be executed by hardware or may be executed by software. In a case where a series of processes is executed by the software, a program which forms the software is installed on a computer. FIG. 14 is a view illustrating a configuration example of the hardware of the computer which executes the above-described series of processes by the program.

In a computer 1000, a central processing unit (CPU) 1001, a read only memory (ROM) 1002, and a random-access memory (RAM) 1003 are connected to one another through a bus 1004. Moreover, an input/output interface 1005 is connected to the bus 1004. An input unit 1006, an output unit 1007, a recording unit 1008, a communication unit 1009, and a drive 1010 are connected to the input/output interface 1005.

The input unit 1006 includes a keyboard, a mouse, a microphone and the like. The output unit 1007 includes a display, a speaker and the like. The recording unit 1008 includes a hard disk, a non-volatile memory and the like. The communication unit 1009 includes a network interface and the like. The drive 1010 drives a removable medium 1011 such as a magnetic disk, an optical disk, a magnetooptical disk, or a semiconductor memory.

In the computer 1000 configured in the above-described manner, the CPU 1001 loads the program recorded in the ROM 1002 and the recording unit 1008 on the RAM 1003 through the input/output interface 1005 and the bus 1004 to execute, and as a result, the above-described series of processes is performed.

The program executed by the computer 1000 (CPU 1001) may be recorded on the removable medium 1011 as a package medium and the like, for example, to be provided. Furthermore, the program may be provided by means of a wired or wireless transmission medium such as a local area network, the Internet, and digital broadcasting.

In the computer 1000, the program may be installed on the recording unit 1008 through the input/output interface 1005 by mounting the removable medium 1011 on the drive 1010. Furthermore, the program may be received by the communication unit 1009 via the wired or wireless transmission medium to be installed on the recording unit 1008. In addition, the program may be installed in advance on the ROM 1002 and the recording unit 1008.

Here, in this specification, the processes performed by the computer according to the program are not necessarily performed in chronological order along the order described as the flowchart. In other words, the process performed by the computer according to the program also includes a process executed in parallel or individually (for example, parallel process or process by object). Furthermore, the program may be processed by one computer (processor) or may be processed in a distributed manner by a plurality of computers.

Note that, the embodiment of the present technology is not limited to the embodiment described above and various modifications may be made without departing from the gist of the present technology.

Furthermore, the present technology can may the following configuration.

(1)

A reception device provided with:

a reception unit which receives a transmission signal obtained by processing a multiplexed stream including a plurality of packets;

a transmission control information analysis unit which analyzes transmission control information for controlling transmission of the transmission signal;

a decoding unit which decodes the transmission signal on the basis of an analysis result of the transmission control information;

a packet information analysis unit which analyzes the multiplexed stream obtained by decoding the transmission signal and sets packet division information for dividing the packets from the multiplexed stream, the packet division information according to at least one of the analysis result of the transmission control information or an analysis result of the multiplexed stream; and a packet processing unit which divides the multiplexed stream into the packets on the basis of the set packet division information.

(2)

The reception device according to (1), in which the transmission control information analysis unit uses known information set in advance as information for decoding the transmission signal out of the transmission control information.

(3)

The reception device according to (2), in which the packet information analysis unit dynamically switches between first packet boundary information which is boundary information of the packets obtained from the analysis result of the transmission control information and second packet boundary information being boundary information of the packets obtained from the analysis result of the multiplexed stream as the packet division information.

(4)

The reception device according to (3), in which the packet information analysis unit sets only the second packet boundary information as the packet division information in a case where the first packet boundary information is not obtained from the analysis result of the transmission control information, and sets the first packet boundary information as the packet division information in a case where the first packet boundary information is obtained from the analysis result of the transmission control information.

(5)

The reception device according to (4), in which the packets are arranged in a block which is a unit of error correction, a plurality of blocks forms a frame, and the frame includes the transmission control information for another frame, the packet information analysis unit sets only the second packet boundary information as the packet division information until a frame to which the transmission control information obtained from another frame is to be applied becomes a processing target and sets the first packet boundary information as the packet division information when the frame to which the transmission control information obtained from the other frame is to be applied becomes the processing target.

(6)

The reception device according to (5), in which the first packet boundary information is included in the transmission control information obtained from the other frame, and the second packet boundary information is included in a header of a plurality of blocks forming the frame to be processed and a header of a packet arranged in the block.

(7)

The reception device according to (6), in which the first packet boundary information is information indicating a position of a head packet and a position of a last packet among the packets arranged in the block.

(8)

The reception device according to (6) or (7), in which the second packet boundary information included in the header of the block is information indicating the position of the head packet out of the packets arranged in the block, and the second packet boundary information included in the header of the packet is a data length of the packet.

(9)

The reception device according to any one of (1) to (8), in which the packet is a variable length packet.

(10)

A data processing method of a reception device, including steps of:

receiving a transmission signal obtained by processing a multiplexed stream including a plurality of packets;

analyzing transmission control information for controlling transmission of the transmission signal;

decoding the transmission signal on the basis of an analysis result of the transmission control information;

analyzing the multiplexed stream obtained by decoding the transmission signal and setting packet division information for dividing the packets from the multiplexed stream, the packet division information according to at least one of the analysis result of the transmission control information or an analysis result of the multiplexed stream; and dividing the multiplexed stream into the packets on the basis of the set packet division information by the reception device.

(11)

A transmission/reception system provided with:

a transmission device and a reception device, in which the transmission device includes:

a transmission unit which transmits a transmission signal obtained by processing a multiplexed stream including a plurality of packets; and the reception device includes:

a reception unit which receives the transmission signal transmitted from the transmission device;

a transmission control information analysis unit which analyzes transmission control information for controlling transmission of the transmission signal;

a decoding unit which decodes the transmission signal on the basis of an analysis result of the transmission control information;

a packet information analysis unit which analyzes the multiplexed stream obtained by decoding the transmission signal and sets packet division information for dividing the packets from the multiplexed stream, the packet division information according to at least one of the analysis result of the transmission control information or an analysis result of the multiplexed stream; and a packet processing unit which divides the multiplexed stream into the packets on the basis of the set packet division information.

REFERENCE SIGNS LIST

1 Transmission system
10 Transmission device
20 Reception device
30 Transmission path
211 Tuner unit
212 Decoding unit
213 Variable length packet processing unit
214 Transmission control information analysis unit
215 Packet information analysis unit
1000 Computer
1001 CPU

The invention claimed is:

1. A reception device, comprising:

a reception unit configured to receive a transmission signal, wherein the transmission signal is obtained based on execution of a process on a multiplexed stream that includes a plurality of packets;

a transmission control information analysis unit configured to analyze transmission control information based on information stored in the reception device, wherein an analysis result of the transmission control information is for control of transmission of the transmission signal, and the analysis result of the transmission control information is based on the analysis of the transmission control information;

a decoding unit configured to decode the transmission signal based on the analysis result of the transmission control information;
a packet information analysis unit configured to:
analyze the multiplexed stream obtained by the decode of the transmission signal; and
set packet division information based on at least one of the analysis result of the transmission control information or an analysis result of the multiplexed stream, wherein the analysis result of the multiplexed stream is based on the analysis of the multiplexed stream;
obtain first packet boundary information from the analysis result of the transmission control information, wherein the first packet boundary information is boundary information of the plurality of packets;
obtain second packet boundary information from the analysis result of the multiplexed stream as the packet division information, wherein the second packet boundary information is boundary information of the plurality of packets; and
dynamically switch between the first packet boundary information and the second packet boundary information; and
a packet processing unit configured to divide the multiplexed stream into the plurality of packets based on the set packet division information.

2. The reception device according to claim 1, wherein the packet information analysis unit is further configured to:
set, in a case where the first packet boundary information is not obtained from the analysis result of the transmission control information, the second packet boundary information as the packet division information; and
set, in a case where the first packet boundary information is obtained from the analysis result of the transmission control information, the first packet boundary information as the packet division information.

3. The reception device according to claim 2, wherein the plurality of packets is in a block of a plurality of blocks, wherein the block is a unit of error correction,
the plurality of blocks corresponds to a first frame,
the first frame includes the transmission control information for a second frame,
the packet information analysis unit is further configured to:
set the second packet boundary information as the packet division information until the second frame becomes a processing target, wherein the transmission control information obtained from the first frame is applied to the second frame; and
set the first packet boundary information as the packet division information based on the second frame that becomes the processing target.

4. The reception device according to claim 3, wherein the first packet boundary information is included in the transmission control information obtained from the first frame, and
the second packet boundary information is included in a header of the plurality of blocks and a header of a packet of the plurality of packets in the block.

5. The reception device according to claim 4, wherein the first packet boundary information is information that indicates a position of a head packet and a position of a last packet among the plurality of packets in the block.

6. The reception device according to claim 4, wherein the second packet boundary information included in a header of the block is information that indicates a position of a head packet of the plurality of packets in the block, and
the second packet boundary information included in the header of the packet is a data length of the packet.

7. The reception device according to claim 1, wherein each packet of the plurality of packets is a variable length packet.

8. A data processing method, comprising:
in a reception device:
receiving a transmission signal, wherein the transmission signal is obtained based on execution of a process on a multiplexed stream that includes a plurality of packets;
analyzing transmission control information based on specific information stored in the reception device, wherein
an analysis result of the transmission control information is for control of transmission of the transmission signal, and
the analysis result of the transmission control information is based on the analysis of the transmission control information;
decoding the transmission signal based on the analysis result of the transmission control information;
analyzing the multiplexed stream obtained by the decode of the transmission signal;
setting packet division information based on at least one of the analysis result of the transmission control information or an analysis result of the multiplexed stream, the analysis result of the multiplexed stream is based on the analysis of the multiplexed stream;
obtaining first packet boundary information from the analysis result of the transmission control information, wherein the first packet boundary information is boundary information of the plurality of packets;
obtaining second packet boundary information from the analysis result of the multiplexed stream as the packet division information, wherein the second packet boundary information is boundary information of the plurality of packets;
dynamically switching between the first packet boundary information and the second packet boundary information; and
dividing the multiplexed stream into the plurality of packets based on the set packet division information.

9. A system, comprising:
a transmission device, wherein
the transmission device includes a transmission unit configured to transmit a transmission signal, and
the transmission signal is obtained based on execution of a process on a multiplexed stream that includes a plurality of packets; and
a reception device, wherein the reception device includes:
a reception unit configured to receive the transmission signal transmitted from the transmission device;
a transmission control information analysis unit configured to analyze transmission control information based on specific information stored in the reception device, wherein
an analysis result of the transmission control information is for control of the transmission of the transmission signal, and the analysis result of the transmission control information is based on the analysis of the transmission control information;
a decoding unit configured to decode the transmission signal based on the analysis result of the transmission control information,
a packet information analysis unit configured to:
  analyze the multiplexed stream obtained by the decode of the transmission signal;
  set packet division information based on at least one of the analysis result of the transmission control information or an analysis result of the multiplexed stream, wherein the analysis result of the multiplexed stream is based on the analysis of the multiplexed stream;
  obtain first packet boundary information from the analysis result of the transmission control information, wherein the first packet boundary information is boundary information of the plurality of packets;
  obtain second packet boundary information from the analysis result of the multiplexed stream as the packet division information, wherein the second packet boundary information is boundary information of the plurality of packets; and
  dynamically switch between the first packet boundary information and the second packet boundary information; and
a packet processing unit configured to divide the multiplexed stream into the plurality of packets based on the set packet division information.

* * * * *